US006841907B2

(12) United States Patent
Kull

(10) Patent No.: US 6,841,907 B2
(45) Date of Patent: Jan. 11, 2005

(54) SPINDLE MOTOR FOR HARD DISK DRIVES HAVING A HYDRODYNAMIC BEARING ARRANGEMENT

(75) Inventor: Andreas Kull, Donaueschingen (DE)

(73) Assignee: Minebea Co., Ltd., Nagano (JP)

(*) Notice: Subject to any disclaimer, the term of this patent is extended or adjusted under 35 U.S.C. 154(b) by 0 days.

(21) Appl. No.: 10/734,013

(22) Filed: Dec. 11, 2003

(65) Prior Publication Data

US 2004/0174078 A1 Sep. 9, 2004

(30) Foreign Application Priority Data

Dec. 12, 2002 (DE) .................... 202 19 216 U

(51) Int. Cl.[7] .............................................. H02K 5/16
(52) U.S. Cl. ................................. 310/90; 310/67 R
(58) Field of Search ................ 310/90, 90.5, 67 R; 384/100, 107; 360/99.08

(56) References Cited

U.S. PATENT DOCUMENTS

| 5,264,748 A | * | 11/1993 | Ootsuka et al. ............... 310/90 |
| 5,433,529 A | | 7/1995 | Hensel |
| 5,516,212 A | | 5/1996 | Titcomb |
| 5,822,846 A | * | 10/1998 | Moritan et al. ............... 29/598 |
| 5,847,479 A | | 12/1998 | Wang et al. |

FOREIGN PATENT DOCUMENTS

| JP | 62140271 | 6/1987 |
| JP | 11-27894 | 1/1999 |
| JP | 2000-175400 | 6/2000 |

OTHER PUBLICATIONS

German Search Report dated Nov. 4, 2003.

* cited by examiner

Primary Examiner—Thanh Lam
(74) Attorney, Agent, or Firm—Joel Lutzker; Anna Vishey; Schulte Roth & Zabel

(57) ABSTRACT

A spindle motor for hard disk drives having a hydrodynamic bearing arrangement. The arrangement has a shaft and a bearing sleeve including an upper sleeve part, a lower sleeve part and a spacer. The upper and lower sleeve parts are axially separated by the spacer. The shaft is positioned within the upper and lower parts. An annular cavity is formed by the upper sleeve part, lower sleeve part and the spacer where a thrust plate, attached to a central position along the longitudinal axis of the shaft, is located.

9 Claims, 1 Drawing Sheet

SPINDLE MOTOR FOR HARD DISK DRIVES HAVING A HYDRODYNAMIC BEARING ARRANGEMENT

CROSS-REFERENCE TO RELATED APPLICATIONS

This application claims all rights of priority to German Patent Application Serial No. DE20219216.4, filed Dec. 12, 2002.

BACKGROUND

The present invention relates to a spindle motor for hard disk drives having a hydrodynamic bearing arrangement.

Spindle motors for hard disk drives essentially consist of a stator, a rotor and at least one bearing system arranged there-between. The electromagnetically driven rotor is rotatably supported in relation to the stator by means of a bearing system. Roller bearings and hydrodynamic journal bearings can be utilized in such bearing systems.

It has been established recently that use of hydrodynamic bearings in such spindle motors is more advantageous than use of roller or ball bearings. Specific advantages of hydrodynamic journal bearings compared to roller bearings lie in their greater running precision, their insensitivity to shock and the need for fewer components. Since the sliding parts do not touch each other at the nominal speed, they have low wear and tear and operate almost noiselessly.

Such a hydrodynamic bearing arrangement is known, for example, from U.S. Pat. No. 5,847,479. In this bearing system, a fluid is used as lubricant which is located in a bearing gap that separates the two bearing surfaces of the parts moving in relation to each other. In operation, the lubricant, preferably oil, forms a load-bearing lubricating film between the bearing surfaces.

The known bearing arrangement includes a bearing sleeve and a shaft which is arranged in an axial bore of the bearing sleeve. The shaft rotates freely in the bearing sleeve and forms a radial bearing together with the sleeve. A thrust plate, which rotates in a corresponding recess in the sleeve, is positioned approximately in the middle of the shaft and, together with a cover plate, forms a thrust bearing. The thrust bearing prevents any displacement between the shaft and the sleeve along the rotational axis. At least one of the mutually interacting bearing surfaces of shaft and sleeve, and thrust plate and cover plate has a groove pattern which, due to the relative movement caused by rotation, produces a pumping action in the lubricant, thus creating the hydrodynamic pressure necessary for bearing stiffness.

In the bearing arrangement described above, the thrust bearing plate is located approximately in the middle of the shaft. The thrust bearing or bearings are thus positioned between the radial bearings along the rotational axis.

BRIEF SUMMARY

The object of the invention is to improve on the design of a hydrodynamic bearing for spindle motors of the type described in the opening paragraphs in such a way that simple and low-cost component parts can be used which additionally enable a simplified means of assembly without detriment to vibration behavior and running precision.

In accordance with the invention, the bearing includes a two-part bearing sleeve with an upper sleeve part and an essentially identically designed lower sleeve part which are axially separated from each other by means of a spacer. The bearing sleeve is connected firmly to the rotor in which the sleeve parts and the spacer are held in such a way that an annular cavity is formed between the sleeve parts within the inner surface of the spacer in order to accommodate the thrust plate centrally positioned along the longitudinal axis of the shaft.

Accordingly, the bearing arrangement consists of two radial bearings separated from each other and a thrust bearing positioned between the radial bearings. Since the thrust bearing is positioned between the radial bearings, the greatest possible span, i.e. the maximum possible distance of the radial bearings from each other, can be exploited.

Such a bearing possesses high stiffness and excellent vibration behavior combined with outstanding running precision without the disadvantage of increased friction losses as in the bearing arrangement mentioned at the outset. Using the combination of a sleeve, two essentially identical sleeve parts and a spacer enables the bearing system components, and consequently the rotor and the spindle motor, to be easily assembled.

In one beneficial embodiment of the invention, the thrust plate, which is firmly fixed to the shaft, has several recesses on its inner diameter that act as lubricant channels between the thrust plate and the shaft to circulate lubricant between the areas of the bearing above and below the thrust plate. By constricting the shaft at the outer end of the bearing sleeve (s), with the narrowest diameter of the shaft being located near the end of the respective bearing sleeve, a concentric space is created whose inner contact surface with the shaft is preferably conical and whose outer contact surface with the corresponding sleeve part is preferably cylindrical. Further, this outer contact surface of the concentric space forms the inner bearing surface of the sleeve. This concentric space creates a reservoir for the lubricant which is held within the space through capillary forces and forces created by adhesion.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWING

The invention is illustrated by way of example and not limitation, and the figure of the accompanying drawing in which.

DETAILED DESCRIPTION

Figure 1:
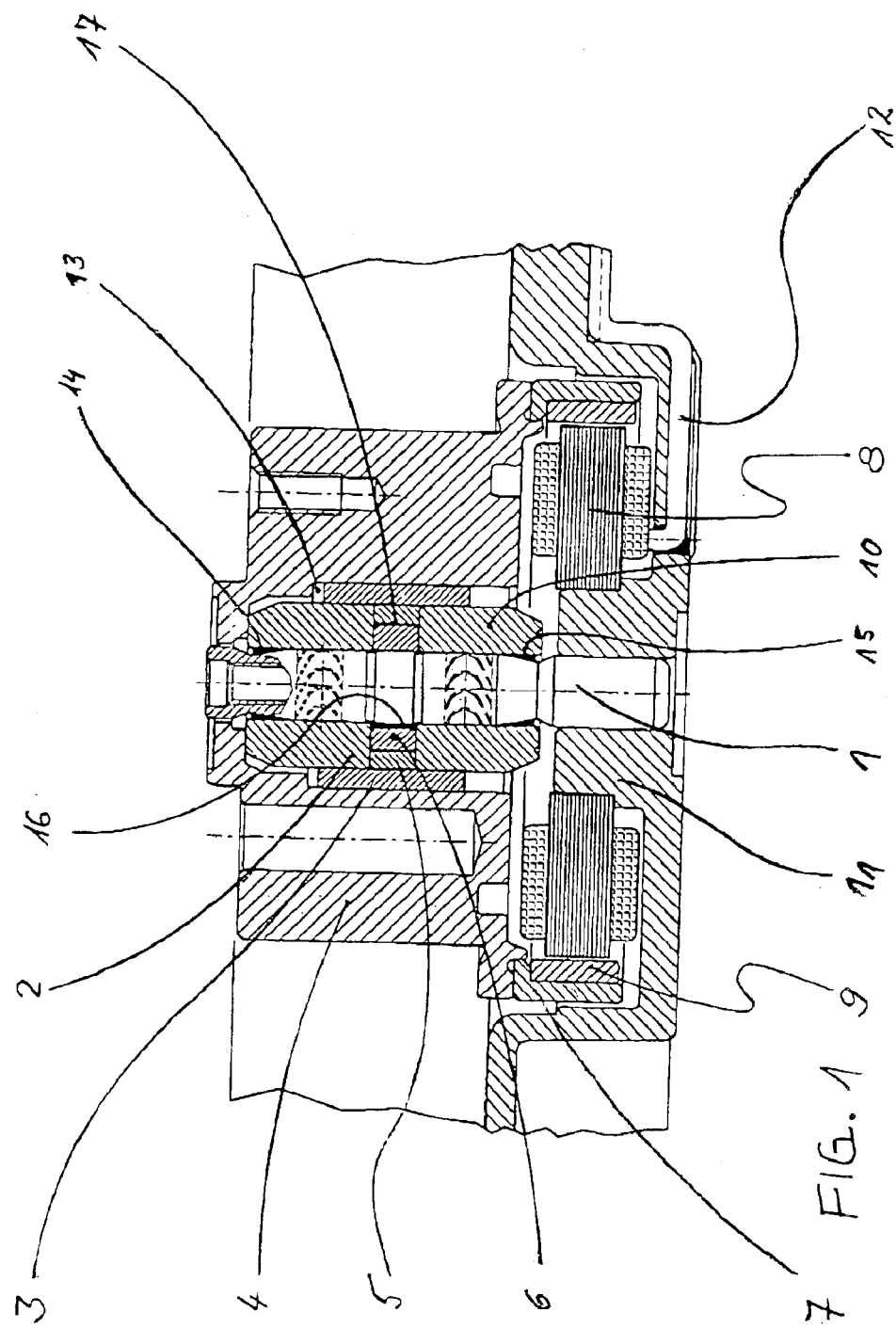
FIG. 1 is a cross-sectional view of the spindle motor with the bearing arrangement according to the present invention.

The embodiment describes a hydrodynamic bearing system which is used as a rotary bearing in a spindle motor. Here, it is assumed that a multi-part sleeve connected to the rotor is rotatably arranged on a stationary shaft. However, the invention can also be applied to embodiments in which a rotor-supporting shaft is arranged in a stationary bearing sleeve so that it is freely rotatable.

The spindle motor shown in FIG. 1 includes a baseplate 11, which supports the stator 8 of the spindle motor. Shaft 1 is accommodated in a central opening of the baseplate 11 and fixed firmly to the baseplate. A thrust plate 6 is positioned in the area in the middle of the shaft 1 and is rigidly fixed to the shaft. The rotor of the spindle motor includes a somewhat bell-shaped hub 4 on which storage disks (not illustrated) of the hard disk drive can be mounted.

The hub 4 is provided with a central recess 13 into which a supporting sleeve 3 is firmly pressed in or bonded. An upper sleeve part 2 and a lower sleeve part 10 are fixed in the supporting sleeve 3 and are kept axially apart from each other by an annular spacer 5. The supporting sleeve 3, sleeve parts 2 and 10 and spacer 5 are rigidly fixed to each other and the hub 4 forming the rotor of the spindle motor. The bearing support for the shaft 1, with the thrust plate 6 fixed to it, is provided by the sleeve parts 2 and 10 arranged on both sides of the thrust plate 6 and separated from each other by means of the spacer 5, whereby the sleeve parts enclose the shaft 1 with a slight radial clearance. Since both the inner diameter of the spacer 5 and its thickness are slightly bigger than the outer diameter and thickness of the thrust plate 6, the shaft 1, together with the thrust plate 6, can rotate freely within the bearing support assembly. At the same time, the radial overlap between the thrust plate 6 and both sleeve parts 2 and 10 ensures that the shaft is securely positioned in an axial direction.

In the area at the outer ends of the sleeve parts 2 and 10, the shaft 1 is conically constricted so that a concentric space widening towards the outside is created between the sleeve parts 2 and 10 and the shaft 1. The concentric space acts as reservoirs 14 and 15 for the lubricant.

At its outer edge, the hub 4 supports a yoke 7 and permanent magnets 9, which interact with the stator 8, whereby the alternating electromagnetic fields generated by the stator 8 set the rotor in motion. Power is supplied to the stator by means of connection leads 12 laid in a cable duct.

The rotary bearing consisting on the one hand of the sleeve parts 2 and 10 held in the sleeve 3 and on the other hand of the shaft 1 together with the thrust plate 6, is designed as a hydrodynamic bearing in which the components rotating in relation to each other are separated from each other during operation by a thin lubricant film in the bearing gap. This continuous lubricant film allows the rotor to "float up" during start-up and enables contact-free rotation at nominal speed.

The shaft 1 is rigidly connected to the thrust plate 6 and is accommodated within a concentric bore, which is preferably formed within the thrust plate. The essentially cylindrical sides of this bore are provided with recesses 16 which form lubricant channels running parallel to the axis. These recesses enable a more rapid pressure or volume balance in the bearing gap between the quantity of lubricant on each side of the thrust plate 6 in the start-up phase.

One of the interfacing hydrodynamic bearing surfaces of the shaft 1 and sleeve 2 and 10 is provided with cylindrical zones having etched groove patterns formed thereon. In the case illustrated in FIG. 1, the groove pattern is formed on the sleeves 2 and 10. Flat end faces of the thrust plate 6 and their corresponding end faces of the sleeve parts 2 and 10 are equally provided with groove patterns (not illustrated).

A pumping action is created by the rotary movement of the bearing surfaces that causes hydrodynamic pressure to be generated within the lubricant film in the area of the grooved zones. Since the local force components in these pressure zones are approximately inversely proportional to the gap thickness, disturbances which affect the rotational axis are immediately compensated in a self-regulating process. The rotational axis is fully stabilized in relation to position and direction by means of hydrodynamic radial and axial bearings.

Here, annular pressure zones concentrically surrounding the shaft 1 are created in the area of the radial bearings as a result of the groove pattern on the cylindrical bearing surfaces of the sleeve parts 2 and 10 above and below the thrust plate 6, whose reaction forces, affecting the rotating sleeve parts, intersect at a central area on the rotational axis with the result totaling zero. The shaft 1 and the sleeve parts 2 and 10 together with their common rotational axis are therefore in a stable equilibrium of forces, that means that deviations of the rotational axis from the correct position are effectively prevented.

A two-directional hydrodynamic thrust bearing stabilizes the axial position of the rotational axis whose coplanar pressure zones are created in the lubricant film on each side of the thrust plate 6 as a result of the groove patterns on the end faces of the sleeve parts 2 and 10. These pressure zones form a thrust bearing pair whose respective axial force components are opposed and have the same magnitude. A stable equilibrium of forces results from the forces affecting the relevant end faces of the sleeve parts 2 and 10 that effectively stabilize the rotational axis in relation to its axial position. Thus, through the pumping action created by the rotation of the rotor, zones of hydrodynamic pressure are built up in the continuous lubricant film along the radial bearing and in the area of the thrust bearing. These zones are responsible for ensuring a stable concentric rotation of the rotor in relation to the shaft 1.

It generally holds true that the stiffness and the damping of the entire bearing arrangement is determined or can be influenced by the thickness of the gap and the viscosity of the lubricant. In assembling the spindle motor, first the thrust plate 6 is fixed to the shaft 1. Next, a first sleeve part 2 or 10 is placed over the shaft 1 holding the thrust plate 6. Then the spacer 5 is pushed over the thrust plate 6. Next, the second sleeve part 10 or 2 is placed over the shaft 1. With the aid of the supporting sleeve 3, the sleeve parts 2 and 10 and the spacer 5 are fixed in their relative positions. The thrust plate 6 is located in the cavity 17 formed by the sleeve parts 2 and 10 and the spacer 5. The bearing arrangement is now fully assembled and can be filled with lubricant, preferably oil. By fitting the supporting sleeve 3 into the recess 13 of the hub 4 equipped with yoke 7 and ring magnet 9, the functional bearing arrangement is mounted in the rotor. Finally, the rotor is placed into a flange or the baseplate 11 by pressing, bonding or rigidly fastening in some other way the lower end of the shaft 1 to the baseplate.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A spindle motor for hard disk drives having a hydrodynamic bearing arrangement comprising:
   a shaft;
   a thrust element mounted on a central portion of said shaft;
   a bearing sleeve, further comprising an upper sleeve part, a lower sleeve part and a spacer, said upper sleeve part being axially separated from said lower sleeve part by said spacer; and an annular cavity formed by said upper sleeve part, said lower sleeve part and said spacer, wherein said upper sleeve part, said lower sleeve part and said spacer encompass said shaft such that said thrust plate is accommodated within said annular cavity.

2. The spindle motor according to claim 1 further comprising a first hydrodynamic radial bearing formed between said upper sleeve part and said shaft and a second hydrodynamic radial bearing formed between said lower sleeve part and said shaft.

3. The spindle motor according claim 1 further comprising a plurality of recesses formed on an inner diameter of said thrust plate.

4. The spindle motor according claim 1, wherein outer diameters of said upper and lower sleeve parts are of the same size.

5. The spindle motor according to claim 1, wherein said shaft is radially constricted in the area of an upper opening of the upper sleeve part and in the area of a lower opening of the lower sleeve part such that a lubricant reservoir is created between the upper and lower sleeve parts and the shaft.

6. The spindle motor according to claim 1, said shaft is radially constricted in the area of an upper opening of the upper sleeve part such that a lubricant reservoir is created between the upper sleeve part and the shaft.

7. The spindle motor according to claim 1, said shaft is radially constricted in the area of a lower opening of the lower sleeve part such that a lubricant reservoir is created between the lower sleeve part and the shaft.

8. The spindle motor according to claim 1, wherein the shaft is fixedly accommodated in a baseplate and wherein said upper and lower sleeve parts rotate around the shaft supporting the rotor.

9. The spindle motor according to claim 1, wherein said upper sleeve part, said lower sleeve part and said spacer are fixedly mounted within a supporting sleeve.

* * * * *